(12) United States Patent
Manickaraj et al.

(10) Patent No.: US 8,918,240 B2
(45) Date of Patent: Dec. 23, 2014

(54) METHOD FOR OPERATING HYBRID VEHICLE

(71) Applicant: GM Global Technology Operations LLC, Detroit, MI (US)

(72) Inventors: Mark A. Manickaraj, Ajax (CA); Aniket Kothari, Southfield, MI (US); Richard A. Marsh, Beverly Hills, MI (US); Lawrence P. Ziehr, Clarkston, MI (US); Norman J. Weigert, Whitby (CA); Rick W. Szymczyk, Whitby (CA); Andrew M. Zettel, Port Moody (CA); Danielle A. Cory, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/842,823

(22) Filed: Mar. 15, 2013

(65) Prior Publication Data

US 2014/0277878 A1    Sep. 18, 2014

(51) Int. Cl.
*B60W 20/00* (2006.01)
*G06F 19/00* (2011.01)

(52) U.S. Cl.
CPC ............. *B60W 20/00* (2013.01); *Y10S 903/903* (2013.01); *B60W 2520/10* (2013.01); *B60W 2510/244* (2013.01); *B60W 20/104* (2013.01); *B60W 2510/246* (2013.01); *B60W 20/108* (2013.01)

USPC ............ 701/22; 701/300; 180/65.8; 903/903

(58) Field of Classification Search
None
See application file for complete search history.

(56) References Cited

U.S. PATENT DOCUMENTS

| | | | |
|---|---|---|---|
| 2005/0251299 A1* | 11/2005 | Donnelly et al. | 701/19 |
| 2008/0288132 A1* | 11/2008 | King et al. | 701/22 |
| 2010/0235016 A1* | 9/2010 | Grider et al. | 701/2 |
| 2011/0196559 A1* | 8/2011 | Preuss | 701/22 |
| 2011/0254708 A1* | 10/2011 | Anderson | 340/988 |
| 2011/0276209 A1* | 11/2011 | Suganuma et al. | 701/22 |
| 2013/0006458 A1* | 1/2013 | Bhattarai et al. | 701/22 |

* cited by examiner

*Primary Examiner* — Michael J Zanelli
(74) *Attorney, Agent, or Firm* — Lionel D. Anderson; Reising Ethington P.C.

(57) ABSTRACT

A method and system used to identify an optimal hybrid vehicle operating mode based on a variety of potential factors, and then recommend the optimal operating mode to the driver so that they can make an informed decision regarding their operating mode selection. In one embodiment, the method uses geographic-, vehicle- and/or environmental-related factors to establish one or more operating zones, monitors the location of the hybrid vehicle and determines when it is within one of the operating zones, and then determines an operating mode that is optimal for that particular operating zone.

22 Claims, 5 Drawing Sheets

METHOD FOR OPERATING HYBRID VEHICLE

FIELD

The present invention generally relates to a hybrid vehicle and, more particularly, to a method for identifying an optimal hybrid vehicle operating mode based on factors relating to the surrounding environment.

BACKGROUND

Some hybrid vehicles use a primary power source like an electric motor for the majority of the vehicle's propulsion needs and supplement that with an auxiliary power source, such as an internal combustion engine, as needed. Certain environmental factors, such as steep inclines on mountain roads, can present unique challenges for hybrid vehicles.

For example, when a hybrid vehicle is attempting to climb a mountain road with a significant grade, the electric motor may exhaust or at least diminish much of the stored charge on the battery. If the state-of-charge (SOC) of the battery falls beneath a certain threshold, the hybrid vehicle may have to rely on the internal combustion engine to provide supplemental propulsion power. In order to accomplish this task without resulting in a significant reduction in power that is noticeable to the driver, a hybrid vehicle operating mode specifically tailored to environments such as this may need to be employed.

SUMMARY

According to one embodiment, there is provided a method for operating a hybrid vehicle with different operating modes. The method may comprise the steps of: (a) retrieving geographic data for one or more areas of interest; (b) retrieving a current location of the hybrid vehicle; (c) using the geographic data to establish one or more operating zones, each operating zone is associated with at least one area of interest and defines an area where a particular operating mode is recommended for the hybrid vehicle; and (d) using a control unit to determine when the current location of the hybrid vehicle is within an operating zone where a particular operating mode is recommended for the hybrid vehicle.

According to another embodiment, there is provided a method for operating a hybrid vehicle with a mountain mode. The method may comprise the steps of: (a) retrieving geographic data for one or more mountains; (b) retrieving a current location of the hybrid vehicle; (c) using the geographic data to establish one or more mountain zones, each mountain zone is associated with at least one mountain and defines an area around the mountain where a mountain mode is recommended for the hybrid vehicle; and (d) using a control unit to determine when the current location of the hybrid vehicle is within a mountain zone where the mountain mode is recommended for the hybrid vehicle.

DRAWINGS

Preferred exemplary embodiments will hereinafter be described in conjunction with the appended drawings, wherein like designations denote like elements, and wherein.

DESCRIPTION

The method described herein may be used to identify an optimal hybrid vehicle operating mode based on factors relating to the surrounding environment, and then recommend the optimal operating mode to the driver so that they can make an informed decision regarding their operating mode selection. Some examples of potential operating modes that may be used include: a mountain mode that is designed for use in mountainous areas with steep roads and that puts a heavy emphasis on the performance of the hybrid vehicle, and an environmental mode that is intended for use in high population areas and is primarily designed to improve fuel economy and reduce emissions. The preceding examples are only two of the potential operating modes that may be available to the hybrid vehicle, as the present method can select from any number of available operating modes, including operating modes not described herein. The present method may be used when a navigational route has been developed and it is generally known where the hybrid vehicle is traveling, as well as instances where no navigational route has been developed and the destination of the hybrid vehicle is generally unknown.

A "hybrid vehicle," as used herein, broadly includes any vehicle that has two or more sources of power that can be used for purposes of vehicle propulsion. Some examples of suitable hybrid vehicles include, but are certainly not limited to, hybrid electric vehicles (HEVs), plug-in hybrid electric vehicles (PHEVs), extended-range electric vehicles (EREVs), two-mode hybrids, full hybrids, power-assist hybrids, mild hybrids, series hybrids, parallel hybrids, series-parallel hybrids, power-split hybrids, BAS or BAS-plus hybrids, hydraulic hybrids, pneumatic hybrids, or any other type of hybrid vehicle. This includes passenger cars, cross-over vehicles, sports-utility vehicles, recreational vehicles, trucks, buses, commercial vehicles, etc. Although the following description is provided in the context of an exemplary plug-in hybrid electric vehicle (PHEV) with a range-extending configuration, it should be appreciated that the present method may be used with any hybrid vehicle and is not limited to any particular type.

Figure 1:
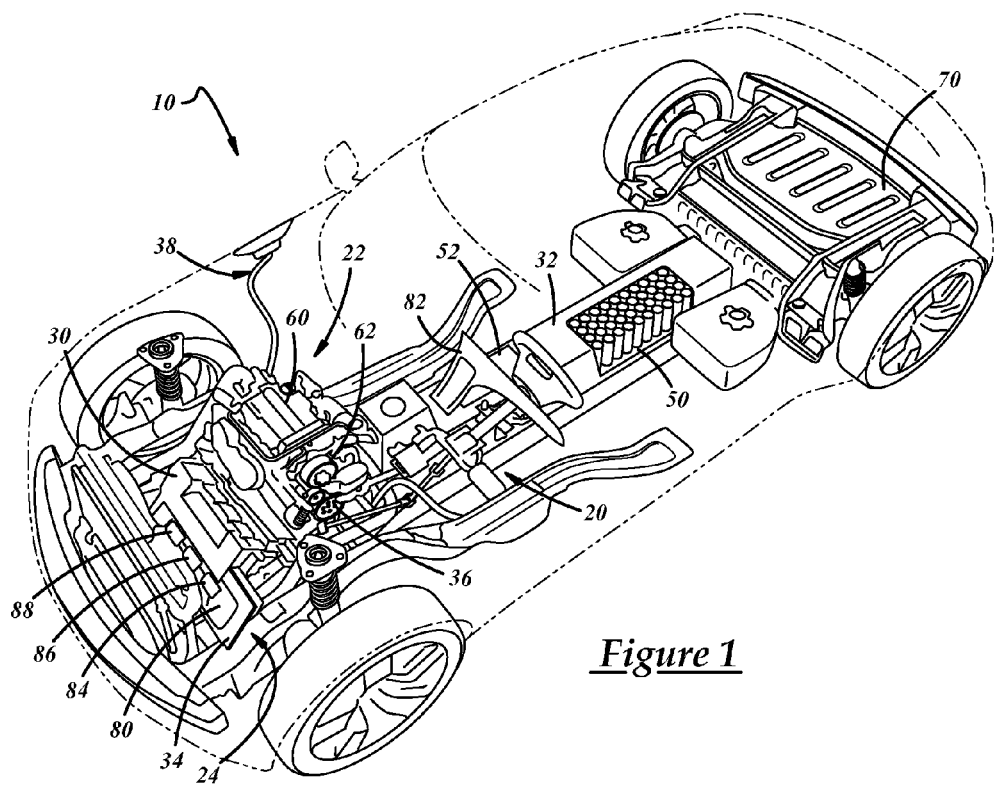
FIG. 1 is a perspective view depicting portions of an exemplary hybrid vehicle.

With reference to FIG. 1, there is shown a schematic view of an exemplary plug-in hybrid electric vehicle (PHEV) 10 having a range-extending configuration where a high voltage battery drives an electric motor for vehicle propulsion, and an internal combustion engine drives a generator for producing electrical energy and/or provides torque to the wheels for vehicle propulsion. According to this exemplary embodiment, hybrid vehicle 10 includes a primary power source 20, an auxiliary power source 22, and a control system 24. Because many of the components of hybrid vehicle 10 are generally known in the art and because many different components and arrangements may be used with the present method, a brief explanation is provided here in lieu of a detailed recitation of their individual structure and functionality.

Primary power source 20 is largely responsible for vehicle propulsion and, according to this particular embodiment, includes a charger 30, a battery 32, an inverter/converter 34, and one or more electric motor(s) 36. In general, battery charger 30 may receive electrical energy from one or more sources, convert and/or condition the electrical energy so that it is in a suitable form for battery 32, and provide the converted electrical energy to the battery where it is stored. During vehicle propulsion, battery 32 provides electrical energy to inverter/converter 34 where it is again converted, this time into a form suitable for electric motor 36, and provided to the electric motor for driving the wheels of the vehicle. During regenerative braking, electric motor 36 may act as a generator and provide electrical energy to battery 32 via inverter/converter 34.

Charger 30 may receive electrical energy from a variety of sources, including external power sources (e.g., a standard AC electrical outlet, a remote charging station, an external generator, etc.) and internal power sources (e.g., an onboard generator). In the case of an external power source, charger 30 receives electrical energy through a suitable power coupling or charging cord 38 that connects the external power source to the charger. Skilled artisans will appreciate that charger 30 may be provided according to any number of different embodiments, may be connected in any number of different configurations, and may include any number of different components, such as transformers, rectifiers, switching power supplies, filtering means, cooling means, sensors, control units and/or any other suitable components known in the art.

Battery 32 may store electrical energy that is used to drive electric motor(s) 36, as well as to meet other electrical needs of the hybrid vehicle. According to an exemplary embodiment, battery 32 includes a high-voltage battery pack 50 (e.g., 40V-600V) and a sensor unit 52. Battery pack 50 includes a number of individual battery cells and may utilize any suitable battery chemistry, including those that are based on the following technologies: lithium ion, nickel metal hydride (NiMH), nickel cadmium (NiCd), sodium nickel chloride (NaNiCl), or some other battery technology. Battery 32 should be designed to withstand repeated charge and discharge cycles and may be used in conjunction with other energy storage devices, such as capacitors, super capacitors, inductors, etc. Those skilled in the art will appreciate that battery 32 may be provided according to any number of different embodiments, may be connected in any number of different configurations, and may include any number of different components, like sensors, control units and/or any other suitable components known in the art.

Inverter/converter 34 may act as an intermediary between battery 32 and electric motor(s) 36, as these devices are often times designed to function according to different operational parameters. For example, during vehicle propulsion inverter/converter 34 can step-up the voltage from battery 32 and convert the current from DC to AC in order to drive electric motor(s) 36, while during regenerative braking the inverter/converter may step-down the voltage generated by a braking event and convert the current from AC to DC so that it can be properly stored by the battery. In a sense, inverter/converter 34 manages how these different operational parameters (i.e., AC versus DC, various voltage levels, etc.) work together. Inverter/converter 34 may include an inverter for DC to AC conversion, a rectifier for AC to DC conversion, a step-up converter or transformer for increasing the voltage, a step-down converter or transformer for decreasing the voltage, other suitable energy management components, or some combination thereof. In the exemplary embodiment shown, inverter and converter units are integrated into a single bi-directional device, however, other embodiments are certainly possible. It should be realized that inverter/converter 34 may be provided according to any number of different embodiments (e.g., with separate inverter and converter units, bi-directional or uni-directional, etc.), may be connected in any number of different configurations, and may include any number of different components, like cooling systems, sensors, control units and/or any other suitable components known in the art.

Electric motor(s) 36 may use electrical energy stored in battery 32 and/or provided by auxiliary power source 22 to drive the vehicle wheels, which in turn propels the hybrid vehicle. While FIG. 1 schematically depicts electric motor 36 as a single discrete device, the electric motor may be combined with a generator (a so-called "mogen") or it may include multiple electric motors (e.g., separate motors for the front and rear wheels, separate motors for each wheel, separate motors for different functions, etc.), to cite a few possibilities. Thus, the following description only refers to a single electric motor 36 even though more than one electric motor may be used by the hybrid vehicle. Primary power source 20 is not limited to any one particular type of electric motor, as many different motor types, sizes, technologies, etc. may be used. In one example, electric motor 36 includes an AC motor (e.g., a three-phase AC induction motor, etc.) as well as a generator that can be used during regenerative braking. Electric motor 36 may be provided according to any number of different embodiments (e.g., AC or DC motors, brushed or brushless motors, permanent magnet motors, etc.), may be connected in any number of different configurations, and may include any number of different components, like cooling features, sensors, control units and/or any other suitable components known in the art.

Auxiliary power source 22 may provide power in the event that battery 32 is depleted and, according to this particular embodiment, includes an engine 60 and a generator 62. In one embodiment, engine 60 turns generator 62, which in turn creates electrical energy that may be used to recharge battery 32, to drive electric motor 36 or other electrical devices in the hybrid vehicle, or to do both. The specific allocation of electrical energy from generator 62 may be influenced by the state of the battery (e.g., does the battery have a low state-of-charge (SOC), etc.), by performance demands on the motor (e.g., is the driver trying to accelerate the vehicle), etc. In another potential embodiment, engine 60 is part of a parallel hybrid system where the engine is mechanically coupled to the vehicle wheels instead of exclusively being used to generate electricity. It is also possible for engine 60 to be replaced with a fuel cell, a hydraulic or pneumatic system, or some other alternative energy supply that is capable of providing electrical energy to the hybrid vehicle.

Engine 60 may be driven according to conventional internal combustion techniques, and may include any suitable type of engine known in the art. Some examples of suitable engines include gasoline, diesel, ethanol, flex-fuel, naturally aspirated, turbo-charged, super-charged, rotary, Otto-cycle, Atkins-cycle and Miller-cycle engines, as well as any other suitable engine type known in the art. According to the specific embodiment shown here, engine 60 is a small fuel-efficient engine (e.g., a small displacement, turbo-charged four-cylinder engine) that receives fuel from fuel tank 70 and uses the mechanical output of the engine to turn generator 62 and/or drive the vehicle wheels. Skilled artisans will appreciate that engine 60 may be provided according to any number of different embodiments, may be connected in any number of different configurations, and may include any number of different components, like sensors, control units and/or any other suitable components known in the art.

Generator 62 may be mechanically coupled to engine 60 so that the mechanical output of the engine causes the generator to create electrical energy that is then provided to battery 32, electric motor 36, or both. As with all of the exemplary components described herein, generator 62 may include one of any number of suitable generators known in the art and is certainly not limited to any particular type. For instance, motor 36 and generator 62 may be combined into a single unit (i.e., a so-called "mogen"), may be connected in any number of different configurations, and may include any number of different components, like cooling units, sensors, control units and/or any other suitable components known in the art. Again, the preceding description of exemplary hybrid vehicle 10 and the illustration in FIG. 1 are only intended to illustrate one potential hybrid arrangement and to do so in a general way. Any number of other hybrid arrangements and architectures, including those that differ significantly from the one shown in FIG. 1, may be used instead.

Control system 24 may be used to control, govern or otherwise manage certain operations or functions of hybrid vehicle 10 and, according to one exemplary embodiment, includes a control unit 80 and a user interface 82. Control unit 80 may use stored algorithms or other electronic instructions to manage certain activities of the various components and devices of both the primary power source 20 and the auxiliary power source 22 and, according to one example, is at least partially responsible for performing the method described below. Depending on the particular embodiment, control unit 80 may be a stand-alone electronic module (e.g., a vehicle integrated control module (VICM), a traction power inverter module (TPIM), a battery power inverter module (BPIM), etc.), it may be incorporated or included within another electronic module in the vehicle (e.g., a radio module, a telematics module, a power train control module, an engine control module, etc.), or it may be part of a larger network or system (e.g., a battery management system (BMS), a vehicle energy management system, etc.), to name a few possibilities. In the context of the present method, control unit 80 may be part of an onboard vehicle module, like a radio or telematics module, or it may be part of a separate mobile device like a smart phone, in which case the control unit 80 executes electronic instructions of the method and wirelessly sends commands to the hybrid vehicle 10 in response thereto. The present method is, therefore, not limited to any particular control unit embodiment, as the method may be carried out by hardware located on the hybrid vehicle 10, hardware located remotely from the hybrid vehicle, or both.

Control unit 80 may include any combination of electronic processing devices 84, memory devices 86, input/output (I/O) devices 88, and/or other known components, and may perform various control and/or communication related functions. Processing device 84 may include any type of suitable electronic processor (e.g., a microprocessor, a microcontroller, an application specific integrated circuit (ASIC), etc.) that executes instructions for software, firmware, programs, algorithms, scripts, etc. This processor is not limited to any one type of component or device. Memory device 86 may include any type of suitable electronic memory means and may store a variety of data and information. This includes, for example: sensed vehicle conditions; look-up tables and other data structures; software, firmware, programs, algorithms, scripts, and other electronic instructions; component characteristics and background information, etc. Electronic instructions corresponding to the present method—as well as any other instructions and/or information needed for such tasks—may also be stored or otherwise maintained in memory device 86. Control unit 80 may be electronically connected to other vehicle devices and modules via I/O device 88 and suitable connections, like a communications bus, so that they can interact as required. These are, of course, only some of the possible arrangements, functions and capabilities of control unit 80, as others are certainly possible.

User interface 82 may be used to exchange information between a vehicle user and the vehicle, and may do so in a variety of ways. For instance, user interface 82 may receive user requests, instructions and/or other input from a vehicle user via: a touch-screen display, a pushbutton or other vehicle control, a keyboard, a microphone (e.g., cases where input is verbally provided and interpreted by a human-machine interface (HMI)), or a wireless communication module (e.g., cases where input is wirelessly provided from a mobile communications device, laptop, desktop, website, backend facility, etc.), to cite a few examples. In addition, user interface 82 may be used to provide operating mode recommendations, vehicle status, reports and/or other output to the vehicle user. The same devices and techniques for providing input, as well as others like a vehicle audio system and instrument panel, may also be used to provide output. In one example, user interface 82 is used by the present method to provide recommendations to the driver regarding a preferred or optimal hybrid vehicle operating mode, as will be discussed in more detail. Other user interfaces may be provided instead, as the exemplary ones shown and described herein represent only some of the possibilities. The present method may utilize any user interface to exchange information with the vehicle and is not limited to any particular type.

The exemplary hybrid vehicle 10 may include more, less or a different combination of elements, components, devices and/or modules than those illustrated and described here, as the present method is not limited to this particular embodiment. For example, hybrid vehicle 10 may include parts such as: a hybrid transmission, a power-split device, a gear box, one or more clutches, a flywheel and/or other hybrid drivetrain components; a low-voltage electrical circuit or bus (e.g., standard 12V, 18V or 42V circuits), an accessory power module (APM), electronic accessories, different electronic modules, a telematics unit, additional electric motors and/or other electronic devices; as well as any other devices that may be found on hybrid vehicles. The components, devices and/or modules shown in FIG. 1 may be integrated or otherwise combined with other parts of the hybrid vehicle, as the illustration in that figure is only meant to generally and schematically illustrate one potential hybrid system arrangement.

Figure 2:
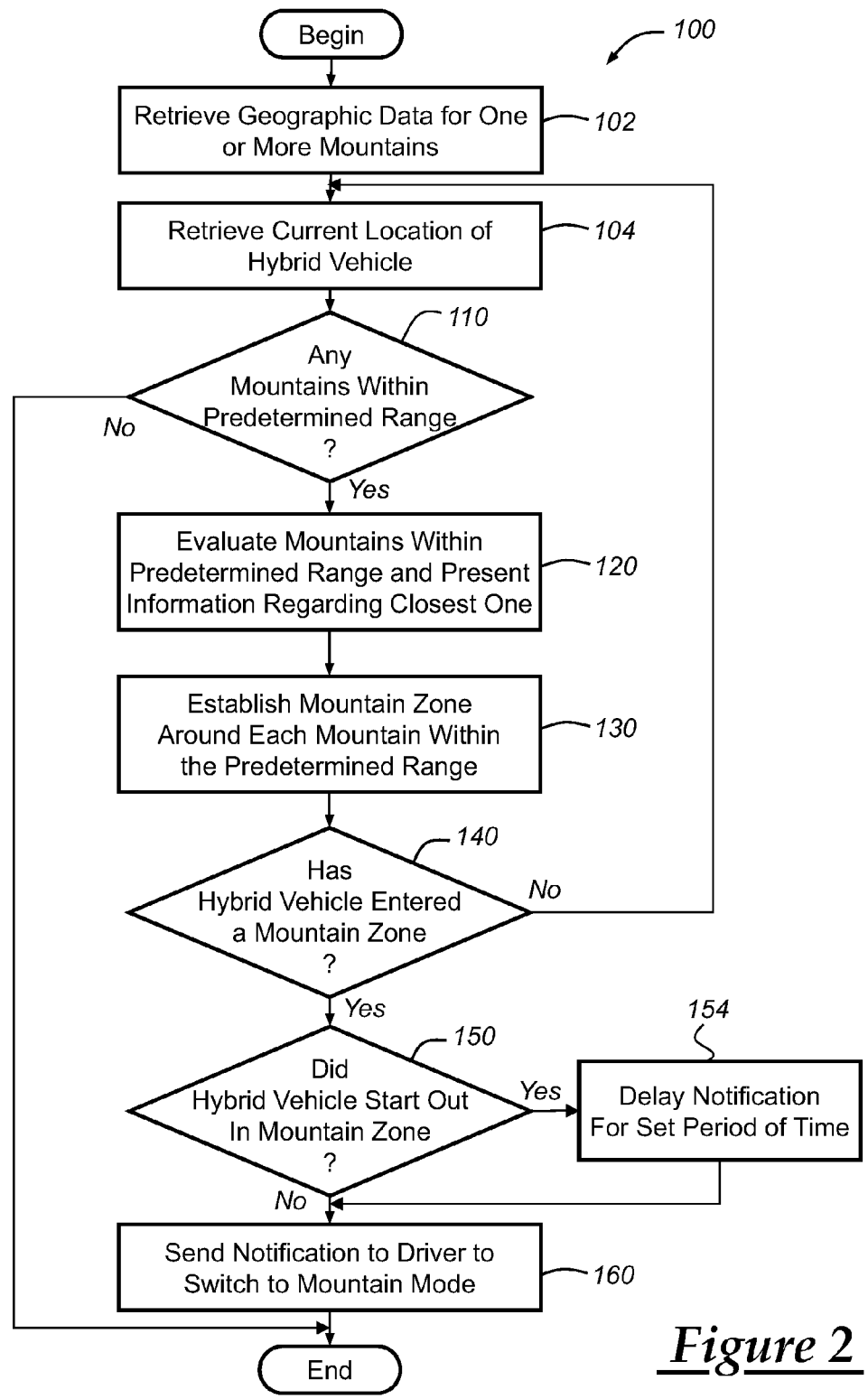
FIG. 2 is a flowchart illustrating certain steps of an exemplary method that may be used to recommend a mountain mode for a hybrid vehicle, such as the exemplary one shown in FIG. 1.

Turning now to FIG. 2, there is shown a first embodiment of the present method 100 that establishes one or more mountain zones in mountainous areas, determines when a hybrid vehicle enters one of the mountain zones, and in response thereto either sends a recommendation to the driver suggesting that they manually switch to a specifically designed mountain mode or automatically switches the hybrid vehicle into a mountain mode. The mountain mode controls different aspects of hybrid vehicle operation, such as battery charge level management, and is generally designed to favor vehicle performance over fuel economy so that the hybrid vehicle can adequately climb steep mountain roads at posted speed limits. The method may begin when the hybrid vehicle 10 is turned on, starts a key cycle, has a certain shift lever position (e.g., when the hybrid vehicle is in drive), or at some other appropriate starting point.

Beginning with step 102, the method retrieves geographic data pertaining to one or more mountains from a mountain database or some other data storage device. In order to determine when hybrid vehicle 10 enters into a particular mountain zone, the method must first establish the boundaries of the zone; the geographic data retrieved here may be used for such a purpose. Mountainous areas oftentimes have sections of road with steep grades or inclines that could potentially pose challenges to hybrid vehicle operation (e.g., long road segments with grades greater than 3%). In order to establish a mountain zone in or around such an area, step 102 gathers geographic data regarding various mountain peaks from a mountain database (e.g., geographic data for all peaks in North America having an elevation greater than a certain amount). The mountain database may be maintained at the hybrid vehicle, such as in memory device 86, or at a remote facility and accessed by the hybrid vehicle via a telematics unit or the like. This geographic data may be used later to establish a mountain zone around each mountain peak, so that when the hybrid vehicle enters such a zone the method can recommend transitioning to a mountain mode that prepares for steep terrain. In one example, the geographic data includes a separate entry for each mountain or peak, and each entry includes: a mountain identifier (e.g., the name of the mountain), a mountain location (e.g., GPS coordinates for the mountain), a mountain elevation (e.g., either a total elevation or an elevation change pertaining to the mountain), a mountain zone size, or some combination thereof. The size of each mountain zone may be static or dynamic, as subsequently explained in greater detail.

Step 104 retrieves the current location of the hybrid vehicle. The current location of hybrid vehicle 10 is needed in order to determine when the hybrid vehicle is close to a mountain or, more specifically, when the hybrid vehicle enters a particular mountain zone. According to an exemplary embodiment, the location of the hybrid vehicle is updated on a periodic basis (e.g., every 60 seconds) and may be obtained from a GPS unit, telematics unit, next generation infotainment unit, or any other component, device and/or module on the hybrid vehicle 10, or on a mobile device, capable of acquiring vehicle position data.

Step 110 then uses the geographic data and the current vehicle location gathered in the previous steps to determine a current distance to each mountain in the mountain database, and then compares that distance to a predetermined range. This step is optional and may be viewed as an initial or baseline check to determine if there are even any mountains within a certain distance of the hybrid vehicle. The predetermined range may be a static value (e.g., the maximum operating range of the hybrid vehicle when it is fully charged and fully fueled), or it may be a dynamic value (e.g., the current operating range of the hybrid vehicle based on its current charge and fuel levels). To illustrate step 110, consider the example where the hybrid vehicle 10 is currently located 1,000 km from the nearest mountain, yet the hybrid vehicle has a maximum operating range of only 500 km (in this example, the predetermined range is 500 km). Because there is little likelihood of the hybrid vehicle 10 encountering a mountainous area and needing the mountain mode on the current key cycle, step 110 concludes that there are no mountains within the predetermined range. If step 110 determines that there are no mountains within the predetermined range, then the method may end or loop back to the beginning for further monitoring; if step 110 determines that one or more mountains are within the predetermined range, then the method proceeds to step 120.

Figure 3:
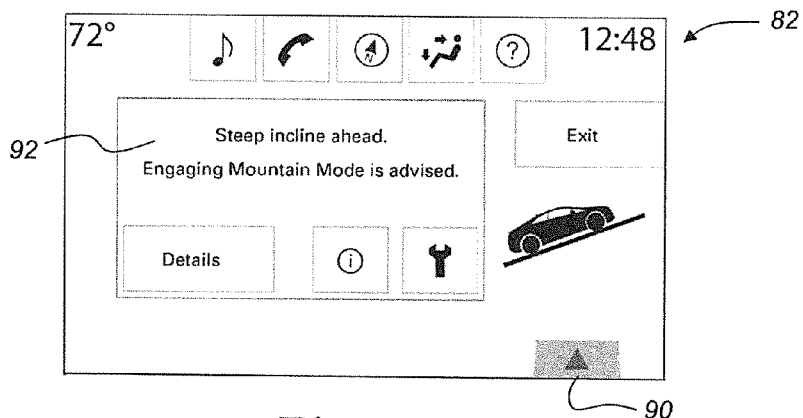
FIG. 3 is an illustration of an exemplary user interface that may be used to recommend to the driver that the hybrid vehicle be switched to a mountain mode.

Step 120 evaluates all of the mountains that were within the predetermined range, and may present certain information to the driver regarding the closest one. This step is also optional, and may be used to provide the driver with some information like distance and heading to the closest mountain. For example, if three separate mountains were found to be within the 500 km predetermined range used above and their respective distances to the hybrid vehicle 10 were 50 km, 100 km and 200 km, then step 120 may evaluate these three mountains by sorting or ranking them according to proximity to the hybrid vehicle. The mountain or peak that is 50 km away is the closest, thus, step 120 may present this information to the driver by displaying the distance and/or the heading or direction to the closest mountain. Any number of techniques may be used for presenting or displaying this information, including the non-limiting example shown in FIG. 3, where a small arrow 90 on user interface 82 is provided that indicates the relative direction from the hybrid vehicle to the nearest peak. Again, step 120 is optional, as the method could omit this step and simply proceed to step 130.

Step 130 establishes a mountain zone around each of the mountains or peaks that were within the predetermined range, and may do so according to a number of different techniques. Skilled artisans will appreciate that by establishing mountain zones only around those mountains found by step 110 to be within the predetermined range, as opposed to all of the mountains in the mountain database, the method may be able to conserve processing resources. As mentioned before, the present method envisions the use of static and dynamic mountain zone sizes.

According to an exemplary embodiment of a static mountain zone size, step 130 simply uses the mountain zone size parameter that was part of the geographic data retrieved in step 102 as a radius, and creates an imaginary circle or other shape around the particular mountain or peak in question based on that radius. A particular mountain may have an associated radius of say 10 km, 25 km or 50 km, for example, so that step 130 builds an imaginary mountain zone that is centered on the mountain location and extends out by the corresponding radius. In the example above, this process would be repeated for all three of the hypothetical mountains within the 500 km predetermined range. It is possible for all of the mountains to have the same mountain zone size (i.e., they all use the same radius), or each mountain could have their own separate mountain zone size based on, for example, the relative size of the mountain. A mountain zone encompassing a peak with an elevation of 4,000 m may have a larger mountain zone size than one encompassing a mountain with an elevation of 1,000 m, as the larger mountain is more likely to have roads that present a challenge to hybrid vehicle operation. Some other parameters that may be used to determine the mountain zone size include: the average grade, the average speed limits, the average altitude (internal combustion engines are generally less capable at higher altitudes), and the average elevation change of one or more roads on the particular mountain in question. Any combination of these and other factors may be used to generate a mountain zone size for each mountain or peak in the mountain database, and this may be done during development and testing of the hybrid vehicle and stored in the memory device 86 or elsewhere. Generally speaking, if the size of a particular mountain zone is independent of the changing parameters in the hybrid vehicle like the battery state-of-charge (SOC) and it is a predetermined parameter stored in the mountain database, the mountain zone size is considered static, even if the size of one mountain zone differs from that of another.

According to an exemplary embodiment of a dynamic mountain zone size, step 130 determines a dynamic mountain zone size that is based on any number of relevant factors and acts as a customized mountain zone around each of the mountain peaks in question and may or may not vary according to changes in the hybrid vehicle. In the static mountain zone size embodiment above, only mountain-related factors were used to determine the size of each mountain zone (e.g., the size of the mountain, the average speed limit of the roads on the mountain, the average incline of the roads on the mountain, etc.); in the current dynamic mountain zone size embodiment, both mountain- and vehicle-related factors may be used. For instance, the dynamic size of a mountain zone may be determined based on one or more of the mountain-related factors listed above, as well as any combination of the following vehicle-related factors: average or current vehicle speed, average or current battery SOC, other energy loads in the hybrid vehicle (e.g., if the air conditioner is running), etc. The dynamic mountain zone size could be based on the average of all of the roads in a particular mountainous area, or it could be based on an individual road or road segment so that a more customized zone size is developed for the specific road or route being traversed, or expected to be traversed in the event the hybrid vehicle is following a known navigational route. It should be appreciated that the preceding examples only represent some of the potential embodiments for establishing dynamic mountain zone sizes, and that other techniques and factors may be used instead.

The following examples are provided to help illustrate some of the potential features of a dynamic mountain zone size. Consider the scenario where a hybrid vehicle is driving towards a mountain with an initial mountain zone radius of 10 km, but the hybrid vehicle is currently operating with a battery SOC of only 35%. Because of the low charge on the battery, step 130 may wish to be more conservative and increase the mountain zone radius to 20 km so that if the hybrid vehicle continues towards the mountain it will have more of an opportunity to preemptively store energy in a mountain mode. This is an example of a dynamic mountain zone size being increased in view of the current state of the vehicle. In other scenarios, the dynamic mountain zone size is decreased because of the current state of the vehicle. Consider the situation where a hybrid vehicle is driving towards a mountain with an initial mountain zone radius of 15 km, but the driver has historically been driving the hybrid vehicle in a very fuel efficient manner at vehicle speeds lower than the corresponding posted speeds. Step 130 may consider this factor and conclude that, based on the driver's historical driving habits, that they are principally concerned with fuel economy and that the likelihood of them wanting to switch to a less fuel efficient mountain mode is low. This, in turn, could result in step 130 decreasing the dynamic mountain zone size to say, 10 km, based on the current state of the vehicle. Other embodiments of this approach are certainly possible.

Next, step 140 determines if the current location of the hybrid vehicle is within any of the mountain zones established above—could be based on either static or dynamic mountain zone sizes. Put differently, the present method uses the offline data gathered in step 102 with the real-time vehicle position acquired in step 104 to determine in step 140 when the hybrid vehicle has entered a mountain zone where there is likely to be roads with steep grades or inclines so that a driver can be notified to switch to a mountain mode that has the capability to ascend such roads at the posted speeds. The size of the mountain zone should be sufficiently large so that a driver can be notified far enough in advance to switch to the mountain mode, thereby giving the hybrid vehicle 10 ample opportunity to charge the high-voltage battery 32 to an elevated state-of-charge (SOC) prior to reaching the steep road segments. According to one exemplary embodiment, step 140 evaluates the current location of the hybrid vehicle and determines if it falls within any of the different areas circumscribed by the different mountain zone size radii. If this step determines that the hybrid vehicle is not within any of the mountain zones in question, then the method may loop back to step 104 for continued monitoring; if it is determined that the current location of the hybrid vehicle is within one or more mountain zones, then the method proceeds to the following step.

At step 150, the method determines if the hybrid vehicle started out in the mountain zone in question or if the hybrid vehicle drove into the mountain zone after it was started. Put differently, step 150 determines if the current key cycle was initiated when the hybrid vehicle 10 was already in the current mountain zone. If the hybrid vehicle started in a mountain zone—indicating that the driver may live in or is visiting a mountainous area—the method may implement an optional delay (e.g., 1-5 minutes), step 154, before notifying the driver to switch to the mountain mode so that the driver can complete their start up routine. This may give the driver an opportunity to manually switch to a mountain mode on their own, in which case the method could omit the recommendation to switch modes in an effort to avoid annoying the driver with a notification that is unnecessary. If step 150 concludes that the hybrid vehicle did not start off in a mountain zone (i.e., the hybrid vehicle was subsequently driven into a mountain zone), then the method may proceed to step 160 without delay; if it is determined that the hybrid vehicle started in a mountain zone, then the method may follow an optional delay in step 154 before proceeding to step 160.

Step 160 sends a notification to the driver recommending that the hybrid vehicle be switched to a mountain mode. There are a variety of ways in which this notification can be presented. For instance, the first time that a notification is provided on a particular key cycle, step 160 could notify the driver with both a visual notification, like the textual message 92 shown in the user interface 82 of FIG. 3, and an audible notification like a chime or mnemonic tone. If a previous notice has already been given on a particular key cycle or within a certain amount of time (e.g., within the last 5 minutes), step 160 may instead simply reiterate the notification with a simple audible notification designed to serve as a reminder. Any suitable combination of visual, audible and other notifications could be used by step 160 to recommend that the driver switch the hybrid vehicle to a mountain mode, and the present method is not limited to any particular one.

In a different embodiment, step 160 automatically switches or transitions the hybrid vehicle from its current operating mode to a mountain mode, as opposed to the driver executing the switch manually. It should, of course, be understood that either the notification feature described above and/or the automatic switching of operating mode feature discussed here may be disabled by a driver at their discretion. This disabling feature may be appreciated by drivers who live in mountainous areas and are already familiar with the best strategies for negotiating steep mountain roads.

Figure 4:
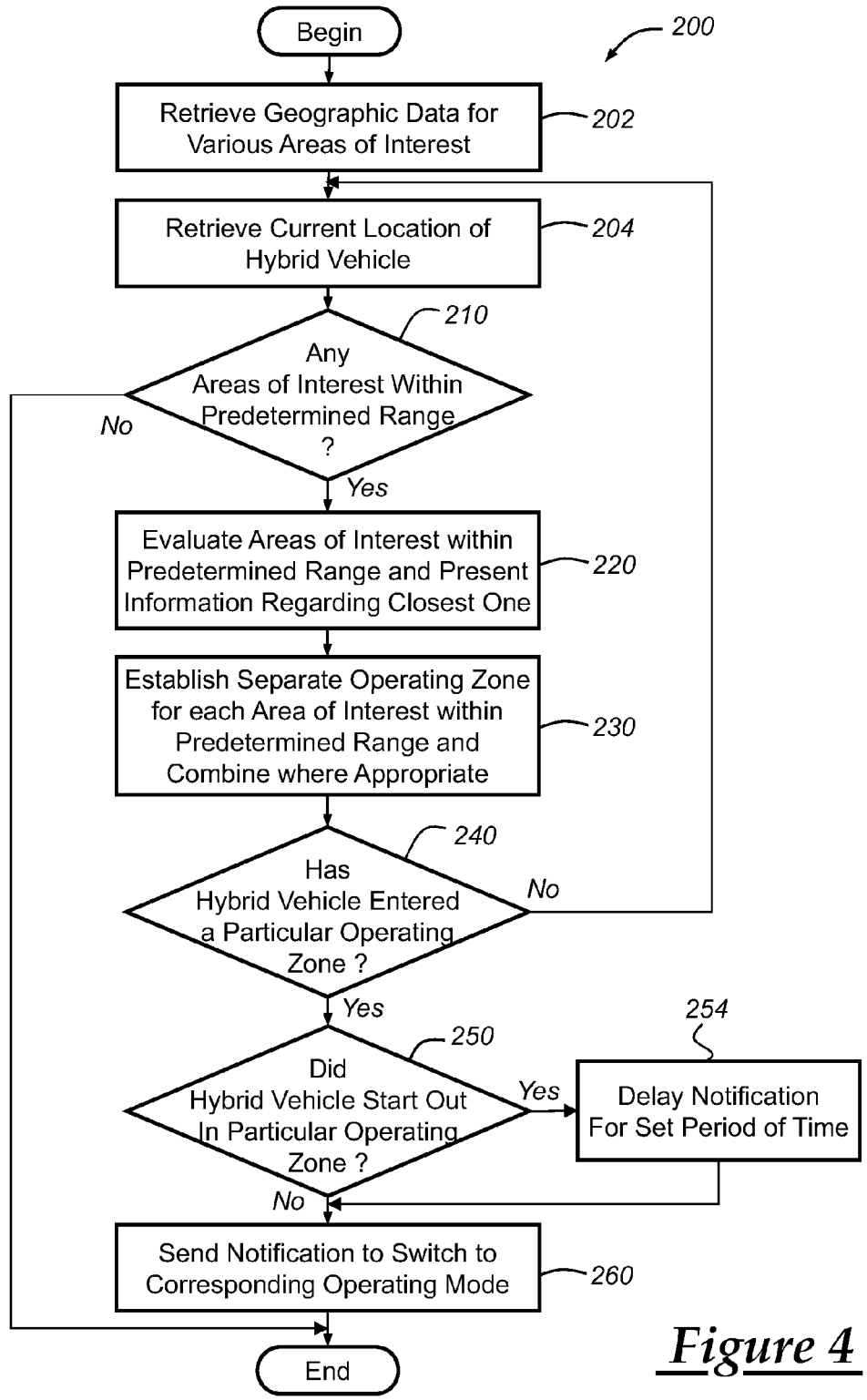
FIG. 4 is a flowchart illustrating certain steps of another exemplary method that may be used to recommend one of several operating modes for a hybrid vehicle, such as the exemplary one shown in FIG. 1.

Turning now to FIG. 4, there is shown a different embodiment of the present method 200. Unlike embodiment 100, which detects when the hybrid vehicle enters a mountain zone and correspondingly recommends a switch to a mountain mode, method 200 may monitor a number of different operating zones and may make recommendations for a variety of different operating modes accordingly. In one possible implementation, method 200 establishes both mountain zones and environmental zones around certain areas, and then notifies the driver that they should switch to a specific optimal operating mode when the hybrid vehicle enters such a zone. As mentioned above, a mountain zone encompasses one or more mountain peaks and is representative of an area where it may be desirable for the hybrid vehicle to switch to a specifically tailored mountain mode that puts an emphasis on vehicle performance so that the hybrid vehicle can sufficiently climb steep mountain roads at posted speeds. An environmental zone, on the other hand, may be located near potentially environmentally sensitive areas such as areas with high smog, dense populations, wildlife areas, etc., and is representative of an area where a conscientious driver may wish to switch the hybrid vehicle to an environmental mode that puts more of an emphasis on environmental concerns like fuel economy and emissions. Although the following description is directed to the use of mountain and environmental zones and modes, it should be appreciated that the method is not limited to only these two types of zones and/or modes, as it is certainly possible for the method to establish other operating zones and to select from other operating modes as well. Some non-limiting examples of operating modes that may be used include: a mountain mode, an environmental mode (also referred to as a normal or hybrid mode), a sport mode, and a hold mode, to cite a few possibilities.

Some of the steps in method 200 closely follow corresponding steps in method 100. In those cases, a full reiteration of the repetitive step has been omitted for purposes of brevity and the description simply refers to the previously described method. Starting with step 202, which may be initiated when the hybrid vehicle is keyed on or otherwise started, the method retrieves geographic data for one or more areas of interest. In the case of mountain zones, this may involve retrieving the mountain-related data described above (e.g., a separate entry for each peak in North America having an elevation greater than a certain amount). In the case of environmental zones, this may involve gathering information for a number of different environmentally-sensitive areas, where each area has its own entry in a database (e.g., all of the towns, cities, counties, etc. in North America having a smog index greater than a certain amount; or all state, provincial or federal parks or protected areas having endangered species). An example of an environmental entry may include: an area identifier (e.g., name of town, city, county), an area location (e.g., GPS coordinates for the area in question), an environmental parameter (e.g., a smog index or a population density for the area), an environmental zone size, or some combination thereof.

The geographic data used here for the different operating zones may be maintained across one or more databases to which the present method has access. For instance, the mountain-related data discussed above may be maintained in a mountain database, and the environmental-related data may be stored in one or more separate environmental databases. According to an exemplary embodiment, step 202 retrieves geographic data from a mountain database, a population database, and a smog database, but these databases could be combined or further broken up, as appreciated by those skilled in the art. The precise way in which the various geographic data or information is stored or maintained is not vital, so long as the method has access to the requisite information. It is further possible for the one or more databases to be maintained on the hybrid vehicle 10 or maintained remotely at some data center such that the information is wirelessly gathered by a telematics unit or the like on the vehicle.

Next, step 204 gathers the current location of the hybrid vehicle. This step corresponds to previously-described step 104; thus, that description is applicable here as well. If no navigational route is known, the method may attempt to anticipate the path of the vehicle based on its current heading, historical driving patterns, etc. If a navigational route has been developed and the hybrid vehicle is following it, then this too may be used.

Step 210 then determines if there are any areas of interest—whether they are mountains, environmental areas or other types of areas—within a predetermined range of the hybrid vehicle. As previously explained, if the hybrid vehicle 10 has an overall operating range of say 500 km and the closest area of interest is 1,000 km away, then the method may simply determine that there is little to no likelihood of the vehicle encountering such an area within the current key cycle and, in order to preserve processing resources, ends the method. As mentioned before, this step is optional and it may use a static or dynamic predetermined range.

Step 220 is similar to corresponding step 120 and evaluates all of the areas of interest that were deemed to be within the predetermined range and may present certain information to the driver regarding one or more of them. In one embodiment, step 220 presents distance, heading and/or other information to the driver for the closest area of interest, and in another embodiment the step presents such information to the driver for the closest area of each category (e.g., the closest mountain, the closest environmentally sensitive area, etc.). The performance of this step is optional, and the exact content and presentation of information may vary from the exemplary user interface 82 shown in FIG. 3.

Next, step 230 establishes a separate zone for each area of interest that was previously determined to be within the predetermined range. The factors and criteria used by step 230 to establish the various zones may include any combination of the factors mentioned in the present application. Step 230 may employ static and/or dynamic zone sizes, as discussed above at some length. In the case of a static zone size, each database entry (which represents a specific area of interest, whether it be a mountainous area, an environmental area, etc.) may include a static zone size parameter, such as a radius, that determines the area of the zone in question. Dynamic zone sizes, on the hand, can be much more complex to establish and can use a variety of mathematical, modeling and/or other techniques to do so.

Figure 5:
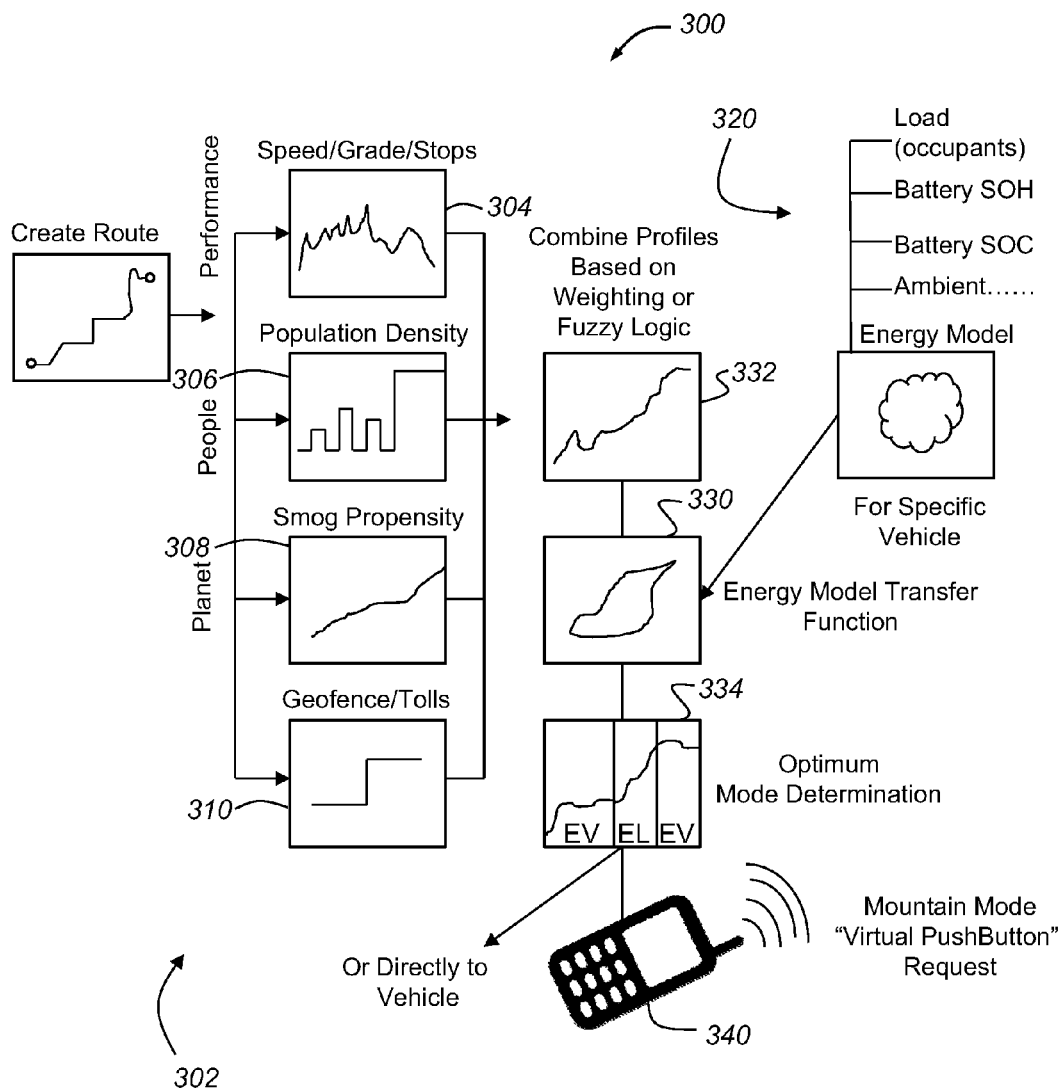
FIG. 5 is a pictorial representation of a model that may be used by a step in the method of FIG. 4 to establish a separate operating zone for each area of interest.

The model 300 illustrated in FIG. 5 is a high level representation of one potential way for step 230 to develop or otherwise establish a dynamic or custom zone around a particular area of interest. Starting with the various types of geographic data 302 that were previously attained in step 202, data from a mountain database 304, data from a population database 306, data from a smog database 308, and any other suitable information, like data from a toll road database 310 is provided to model 300. Skilled artisans will appreciate and understand the various ways in which the data in these databases or other data structures may be acquired, filtered and/or otherwise processed so that it is in a suitable form for use in model 300. Any such way may be utilized here. Moreover, mountain database 304 may include other information, such as information pertaining to certain stretches of road where switching to a particular an environmental mode may be beneficial for fuel economy or some other factor.

Next, the model 300 may develop a separate collection of operating zones for each of the data sources listed above; some of these operating zones may be adjusted, merged and/or altered later on. With reference to the map in FIG. 6, a first collection of mountain zones may be developed for each mountain database entry that was found to be within the predetermined range. In the example above where three separate mountain peaks were found to be within the 500 km predetermined range, the model 300 could initially develop a separate mountain zone 400, 402, 404 for each of these mountains. A second collection of population zones could then be established for each town, city or other area where the population density exceeds a certain threshold. Assume that two different cities are located within the 500 km predetermined range that satisfy the population density requirements; in this case, two separate population zones 410, 412 could initially be established. A similar process could be carried out to establish a third collection of smog or pollution zones; that is, areas where smog or other air pollution propensity exceeds some level. Assume in this example that a single industrial area within the 500 km predetermined range qualifies so that one smog zone 420 is created. A fourth collection of fuel efficiency zones may also be established, and each fuel efficiency zone represents an area where, due to the road grade, speed limits, road geometry, etc., switching to an environmental mode may be beneficial for fuel economy or some other reason. In the present example, a single fuel efficiency zone 422 is identified.

According to the non-limiting example above, seven separate operating zones have been established (three are mountain zones, two are population zones, one is a smog zone, one is a fuel efficiency zone). The size and shape of the zones have been varied to demonstrate that each zone may have a dynamic zone size and that is customized to fit the particular data. It is also possible for the zones to have different shapes and sizes (e.g., non-circular or non-oval), or to all have the same shape and size. In the context of non-circular zones like zone 422, the term "radius" is not being used in a strict geometric sense, but rather as a dimension of the zone (e.g., in a square or rectangular zone, the radius could be a dimension for one of the sides of the zone). Other embodiments are possible as well.

At this point, the model 300 evaluates the different operating zones to see if any should be combined, merged and/or otherwise altered. This too can be performed in a variety of different ways. One potential reason for adjusting the size and/or shape of the various zones would be to take into account parameters 320 relating to the state of hybrid vehicle 10. For instance, the battery state-of-health (SOH), the battery state-of-charge (SOC), the ambient or battery temperature, and the presence of any other electrical loads currently requiring energy could all be factors that may lead to an adjustment of one or more of the different operating zones 400-422. Zone size adjustment based on vehicle-related factors was discussed above but is further addressed in the following example: if the current temperature is in an ideal operating range, the battery SOH and SOC are both at healthy and fully charged levels, and there are currently no major additional energy drains on the battery, then it may be desirable to increase the size of the population zones 410, 412 and/or the smog zone 420. Increasing the size of these zones makes it more likely that the hybrid vehicle 10 will pass through them and, thus, more likely that the method will suggest that the driver switch to an environmental mode. But this would be acceptable considering that the hybrid vehicle 10 is currently in a good state to handle such a transition. In other scenarios, the model 300 may determine that the size of a particular operating zone should be decreased or altered in shape, as opposed to increased.

Skilled artisans will appreciate that there are any number of mathematical, statistical and other techniques that could be used to carry out the zone size adjustment discussed above, including those that utilize cost functions, weighting, fuzzy logic and more. Any of these, as well as other suitable techniques, may be employed by the model 300 and are pictorially represented at stage 330.

Figure 6:
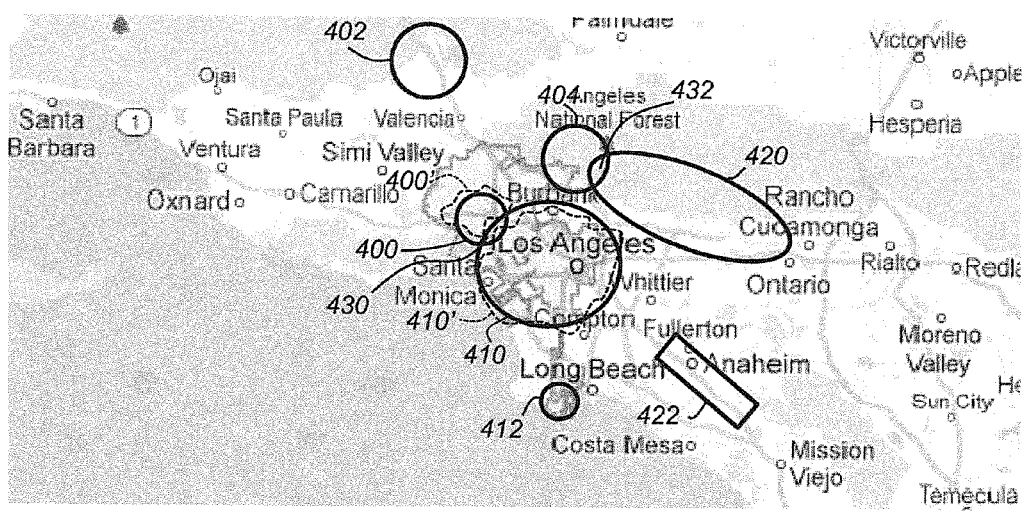
FIG. 6 is a pictorial representation of the different operating zones established by the model in FIG. 5.

With reference back to FIG. 6, for the non-overlapping operating zones (e.g., zones 402, 412, 422), the model 300 may not require any further adjustment, as the model has already taken geographic-, environmental- and/or vehicle-related factors into consideration. The overlapping operating zones (e.g., zones 400, 410 and 404, 420) may present a different scenario, as it may not be clear to the method which driving mode to recommend when the hybrid vehicle is in an overlapping zone area 430, 432. An overlapping zone area represents a geographic area where competing conditions lead to it being an area that may be desirable for more than one vehicle operating mode. For example, overlapping zone area 430 is an area having steep roads and other topography that may make a mountain mode desirable (that is why it is encompassed by mountain zone 400), but it is also part of a high population density area which makes it well suited for an environmental or hybrid mode which is more eco-friendly (which is why it is also encompassed by population zone 410). These competing interests may be resolved by the model 300 using mathematical, statistical and other techniques that employ cost functions, weighting, fuzzy logic and more. This process is pictorially represented at stage 332, and the redrawn zones are shown in FIG. 6 as 400' and 410'. According to one example, the severity or magnitude of the different data (e.g., the severity of the mountain roads versus the severity of the population density) could be used by a cost function to resolve this conflict. A similar process could be used to address the overlapping zone area 432. If both of the overlapping operating zones are designed to recommend the same operating mode, then they may be combined or merged into a single operating zone.

The model 300 has now been used by step 230 to establish a different zone for each area of interest. Because zones 410, 412 and 420 are all environmental zones (i.e., they are all zones where an eco-friendly environmental or hybrid mode is recommended for the hybrid vehicle), they may be joined or otherwise combined together. It should be kept in mind that the primary reason for establishing the different operating zones is so that the method may recommend an optimal operating mode to the driver, or automatically switch modes, when the hybrid vehicle enters into a particular zone. Thus, combining zones that call for the same operating mode is logical and is pictorially represented at stage 334.

As already mentioned, the present method or portions of the present method may be embodied in software or other electronic instructions that are saved and executed at the hybrid vehicle itself, or are saved and executed elsewhere. One such arrangement has the method being stored and executed at a mobile device 340, such that the mobile device sends operating mode recommendations to user interface 82 in the hybrid vehicle or elsewhere. It is not necessary that the method be stored and/or executed by any particular piece of hardware or at any particular location, as many possible arrangements exist. Now that the different operating zones have been established and adjusted, where needed, the method continues to step 240.

Returning to the flowchart in FIG. 4, step 240 monitors to see if the hybrid vehicle has entered a particular zone, whether it be a mountain zone, environmental zone, etc. This process was described in conjunction with the previous method, and that description is applicable here as well. If the hybrid vehicle 10 has not entered any of the different zones, then the method returns to step 204 for continued monitoring. If, on the other hand, the hybrid vehicle has entered a particular zone, the method may continue on to step 250.

Like before, method 200 may determine if the hybrid vehicle started out in the particular zone that it is now in, step 250. If so, then step 254 may delay notifying the driver to switch operating modes in an effort to let the driver get settled and complete their start up routine. This may prevent the driver becoming irritated with a system that is always instructing them to switch operating modes as soon as they enter the vehicle and turn it on.

Step 260 may then send notification to the driver to switch to a particular driving mode, such as the mountain and environmental modes described above. In the event that hybrid vehicle 10 can operate in more than two different driving modes, step 260 could recommend a switch to any number of such modes, as the present method is not limited to the number of modes or the actual modes itself. Mountain and environmental modes were selected to illustrate the present method. As previously mentioned, it is also possible for step 260 to automatically switch the hybrid vehicle 10 to another more optimal mode according to the outcome of the method. Thus, the method described herein may be used to identify an optimal hybrid vehicle operating mode based on factors relating to the surrounding environment, and then recommend the optimal operating mode to the driver so that they can make an informed decision regarding their operating mode selection.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps illustrated in FIG. 2 is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for operating a hybrid vehicle with different operating modes, comprising the steps of:
    (a) retrieving geographic data for one or more areas of interest;
    (b) retrieving a current location of the hybrid vehicle;
    (c) using the geographic data and a vehicle-related factor pertaining to a state of the hybrid vehicle to establish one or more operating zones, each operating zone is associated with at least one area of interest and defines an area where a particular operating mode is recommended for the hybrid vehicle, and the size and/or shape of at least one operating zone is dynamically adjusted at least partially based on the vehicle-related factor while the hybrid vehicle is operating; and
    (d) using a control unit to determine when the current location of the hybrid vehicle is within an operating zone where a particular operating mode is recommended for the hybrid vehicle.

2. The method of claim 1, wherein step (a) further comprises retrieving geographic data for a plurality of areas of interest from one or more databases maintained either on the hybrid vehicle or at a remote facility.

3. The method of claim 1, wherein step (c) further comprises using a static radius to establish an operating zone, the static radius creates an imaginary area around a particular area of interest that generally does not change while the hybrid vehicle is operating, and step (d) further comprises determining when the current location of the hybrid vehicle is within an operating zone by determining when the hybrid vehicle is within the imaginary area.

4. The method of claim 1, wherein step (c) further comprises using a dynamic radius to establish an operating zone, the dynamic radius creates an imaginary area around a particular area of interest that generally changes while the hybrid vehicle is operating, and step (d) further comprises determining when the current location of the hybrid vehicle is within an operating zone by determining when the hybrid vehicle is within the imaginary area.

5. The method of claim 4, wherein step (c) further comprises using a dynamic radius to establish a mountain zone having an imaginary area that is based on the dynamic radius and generally changes while the hybrid vehicle is operating, and the dynamic radius is based on at least one mountain-related factor and at least one vehicle-related factor selected from the group consisting of: a vehicle speed, a battery state-of-charge (SOC), a battery state-of-health (SOH), a battery temperature, or the presence of an energy load in the hybrid vehicle.

6. The method of claim 4, wherein step (c) further comprises using a dynamic radius to establish an environmental zone having an imaginary area that is based on the dynamic radius and generally changes while the hybrid vehicle is operating, and the dynamic radius is based on at least one environmental-related factor and at least one vehicle-related factor selected from the group consisting of: a vehicle speed, a battery state-of-charge (SOC), a battery state-of-health (SOH), a battery temperature, or the presence of an energy load in the hybrid vehicle.

7. The method of claim 1, wherein step (c) further comprises using geographic data to establish a mountain zone that is associated with at least one mountain and defines an area where a mountain mode is recommended for the hybrid vehicle, and the geographic data includes at least one item selected from the group consisting of: a mountain identifier, a mountain location, a mountain elevation, a mountain zone size, or a radius.

8. The method of claim 1, wherein step (c) further comprises using geographic data to establish an environmental zone that is associated with at least one environmental area and defines an area where an environmental mode is recommended for the hybrid vehicle, and the geographic data includes at least one item selected from the group consisting of: an area identifier, an area location, an environmental parameter, an environmental zone size, or a radius.

9. The method of claim 1, wherein step (c) further comprises using the geographic data to establish a first operating zone associated with a first area of interest and a second operating zone associated with a second area of interest, and step (d) further comprises recommending a first operating mode when the hybrid vehicle is within the first operating zone and recommending a second operating mode when the hybrid vehicle is within the second operating zone, wherein the first and second operating modes are different.

10. The method of claim 1, further comprising the step of: when the hybrid vehicle is within an operating zone, sending a notification recommending that the hybrid vehicle be switched to a particular operating mode.

11. The method of claim 1, further comprising the step of: when the hybrid vehicle is within an operating zone, then automatically switching the hybrid vehicle to a particular operating mode.

12. The method of claim 1, wherein the control unit is part of the hybrid vehicle or a mobile device.

13. A method for operating a hybrid vehicle with different operating modes, comprising the steps of:
    (a) retrieving geographic data for one or more areas of interest;
    (b) retrieving a current location of the hybrid vehicle;
    (c) using the geographic data and the current location of the hybrid vehicle to determine a distance from the hybrid vehicle to each of the one or more areas of interest, comparing each distance to a predetermined range and identifying those areas of interest within the predetermined range, and only performing steps (d) and (e) for those areas of interest within the predetermined range;
    (d) using the geographic data to establish one or more operating zones, each operating zone is associated with at least one area of interest and defines an area where a particular operating mode is recommended for the hybrid vehicle; and
    (e) using a control unit to determine when the current location of the hybrid vehicle is within an operating zone where a particular operating mode is recommended for the hybrid vehicle.

14. The method of claim 13, wherein the predetermined range is based on either a maximum operating range of the hybrid vehicle or a current operating range of the hybrid vehicle.

15. The method of claim 13, further comprising the step of: identifying an area of interest within the predetermined range that is closest to the current location of the hybrid vehicle and presenting information pertaining to the closest area of interest, wherein the information includes at least one item selected from the group consisting of: a distance from the hybrid vehicle to the closest area of interest or a heading from the hybrid vehicle to the closest area of interest.

16. A method for operating a hybrid vehicle with different operating modes, comprising the steps of:
    (a) retrieving geographic data for one or more areas of interest;
    (b) retrieving a current location of the hybrid vehicle;
    (c) using the geographic data to establish one or more operating zones, each operating zone is associated with at least one area of interest and defines an area where a particular operating mode is recommended for the hybrid vehicle; and
    (d) using a control unit to determine when the current location of the hybrid vehicle is within an operating zone where a particular operating mode is recommended for the hybrid vehicle and sending a notification recommending that the hybrid vehicle be switched to a particular operating mode, wherein the method further comprises determining if the hybrid vehicle started a key cycle within the operating zone, and delaying notification recommending that the hybrid vehicle be switched to the particular operating mode when the hybrid vehicle started the key cycle within the operating zone.

17. A method for operating a hybrid vehicle with a mountain mode, comprising the steps of:
    (a) retrieving geographic data for one or more mountains;
    (b) retrieving a current location of the hybrid vehicle;
    (c) using the geographic data to establish one or more mountain zones, each mountain zone is a customized mountain zone at least partially based on mountain-related factors that are associated with at least one mountain and defines an area around the mountain where a mountain mode is recommended for the hybrid vehicle; and
    (d) using a control unit to determine when the current location of the hybrid vehicle is within a mountain zone where the mountain mode is recommended for the hybrid vehicle.

18. The method of claim 17, wherein step (c) further comprises using a static radius to establish a mountain zone, the static radius creates an imaginary area around one or more mountains that generally does not change while the hybrid vehicle is operating, and step (d) further comprises determining when the current location of the hybrid vehicle is within the mountain zone by determining when the hybrid vehicle is within the imaginary area.

19. The method of claim 17, wherein step (c) further comprises using a dynamic radius to establish a mountain zone, the dynamic radius creates an imaginary area around one or more mountains that generally changes while the hybrid vehicle is operating, and step (d) further comprises determining when the current location of the hybrid vehicle is within the mountain zone by determining when the hybrid vehicle is within the imaginary area.

20. The method of claim 17, further comprising the step of: when the hybrid vehicle is within a mountain zone, sending a notification recommending that the hybrid vehicle be switched to a mountain mode.

21. The method of claim 20, further comprising the step of: determining if the hybrid vehicle started a key cycle within the mountain zone, and delaying notification recommending that the hybrid vehicle be switched to the mountain mode when the hybrid vehicle started the key cycle within the mountain zone.

22. The method of claim 17, further comprising the step of: when the hybrid vehicle is within a mountain zone, then automatically switching the hybrid vehicle to a mountain mode.

* * * * *